M. R. DOWLIN.
Gag-Runner for Harness.

No. 223,896. Patented Jan. 27, 1880.

WITNESSES:
Henry N. Miller
C. Sedgwick

INVENTOR:
M. R. Dowlin
BY Munn & Co
ATTORNEYS.

N. PETERS, PHOTO-LITHOGRAPHER, WASHINGTON, D. C.

UNITED STATES PATENT OFFICE.

MARSHALL R. DOWLIN, OF NORTH ADAMS, MASSACHUSETTS.

GAG-RUNNER FOR HARNESS.

SPECIFICATION forming part of Letters Patent No. 223,896, dated January 27, 1880.

Application filed October 29, 1879.

*To all whom it may concern:*

Be it known that I, MARSHALL R. DOWLIN, of North Adams, in the county of Berkshire and State of Massachusetts, have invented a new and useful Improvement in Gag-Runners for Harness, of which the following is a specification.

Figure 1:
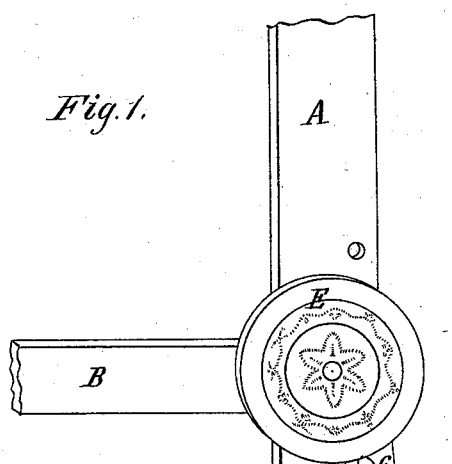
Figure 2:
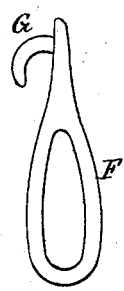
Figures 3, 4:
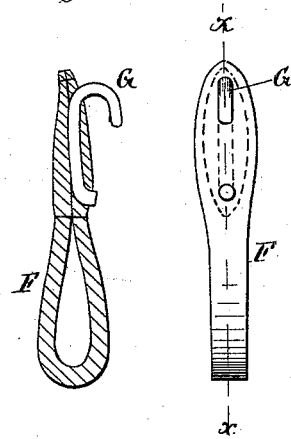

Figure 1 is a perspective view of my improvement. Fig. 2 is a side elevation of the gag-runner detached. Fig. 3 is a sectional elevation of a modified form, taken through the line $xx$, Fig. 4. Fig. 4 is a front elevation of the modified form.

Similar letters of reference indicate corresponding parts.

The object of this invention is to furnish gag-runners for harness, which shall be so constructed that they may be readily adjusted higher and lower, and may be conveniently attached and detached, as required.

The invention consists in the combination of a metal hook with the loop of a gag-runner, so that the gag-runner may be readily attached, detached, and adjusted, as required, as will be hereinafter fully described.

A represents the top strap, B the front strap, C the cheek-strap, D the throat-latch billet, and E the rosette, of a head-stall, about the construction of which parts there is nothing new. F is the loop of the gag-runner, which has a hook, G, formed upon or attached to its upper end or stem. The loop F may be made of metal, as shown in Figs. 1 and 2, in which case the hook G is formed in one piece with the said loop F; or the loop F may be made of leather, as shown in Figs. 3 and 4, in which case the hook G is sewed into or otherwise secured to the said loop F. The hook G is hooked in holes in the throat-latch billet D, which holes may be the holes for the buckle-tongue, or holes formed expressly for the said hook G.

With this construction the gag-runner F G can be readily adjusted higher or lower, as it may be desirable to raise or lower the check-rein. If desired, holes may be formed in the top strap, A, above the rosette E, to receive the hook of the gag-runner F G, when it is desired to have the check-rein high. With this construction, also, the gag-runners F G may be unhooked when the horse is to be left standing, to give the horse's head greater freedom of movement, while preventing him from lowering his head to the ground, as he would be liable to do if unchecked.

I am aware that a gag-runner loop has been cast with a button at one side; but this requires a long and wide slot, which so weakens the throat-latch billet that it frequently breaks under the strain on the check-rein, this being sometimes followed by a runaway and serious accidents.

What I claim as new is—

As an article of manufacture, a gag-runner loop provided with the hook G, adapted to fasten in the ordinary perforation of a throat-latch, as shown and described.

MARSHALL R. DOWLIN.

Witnesses:
WM. JERDAN,
F. F. WILCOX.